(12) United States Patent
Klijn

(10) Patent No.: US 6,911,607 B2
(45) Date of Patent: Jun. 28, 2005

(54) DOSING DEVICE

(75) Inventor: Erik Hans Klijn, Heeg (NL)

(73) Assignee: E.H. Klijn Beheer B.V., Heeg (NL)

( * ) Notice: Subject to any disclaimer, the term of this patent is extended or adjusted under 35 U.S.C. 154(b) by 28 days.

(21) Appl. No.: 10/297,865

(22) PCT Filed: Jun. 11, 2001

(86) PCT No.: PCT/NL01/00440
§ 371 (c)(1), (2), (4) Date: Apr. 4, 2003

(87) PCT Pub. No.: WO01/96006
PCT Pub. Date: Dec. 20, 2001

(65) Prior Publication Data
US 2004/0011569 A1 Jan. 22, 2004

(30) Foreign Application Priority Data
Jun. 14, 2000 (NL) ............................................. 1015439

(51) Int. Cl.⁷ .................. G01G 19/22; B01F 15/04; B29C 14/10
(52) U.S. Cl. ............... 177/116; 177/199; 177/121; 222/77
(58) Field of Search ............. 177/116–121; 222/55, 56, 77; 141/83

(56) References Cited
U.S. PATENT DOCUMENTS 3,804,298 A * 4/1974 Ricciardi ................... 222/56
3,822,866 A 7/1974 Daester et al.
3,927,560 A * 12/1975 Farr ....................... 73/862.633
4,088,308 A * 5/1978 Gingher, Jr. ................ 266/90
4,775,949 A * 10/1988 Kalata ....................... 700/305
5,132,897 A * 7/1992 Allenberg ................... 700/29
5,148,943 A 9/1992 Moller
5,641,948 A 6/1997 Burkhard
5,753,868 A * 5/1998 Diem ......................... 177/70
6,059,144 A 5/2000 Vollmar

FOREIGN PATENT DOCUMENTS

CH 679 564 A5 3/1992
EP 0 898 156 A1 2/1999

* cited by examiner

Primary Examiner—Randy W. Gibson
(74) Attorney, Agent, or Firm—The Webb Law Firm

(57) ABSTRACT

The invention relates to a dosing device for mixing additive into a basic flow, comprising: a passage for the basic flow; an inlet for the additive in the passage; a container for the additive connected to the inlet via a dosing mechanism and having a controllable drive for discharge of the additive into the inlet; weighing means for determining the weight of at least the container with the additive; and a control for the drive which is connected to the weighting means for setting a dosed discharge, wherein the dosing mechanism is arranged on the inlet via the weighing means.

7 Claims, 1 Drawing Sheet

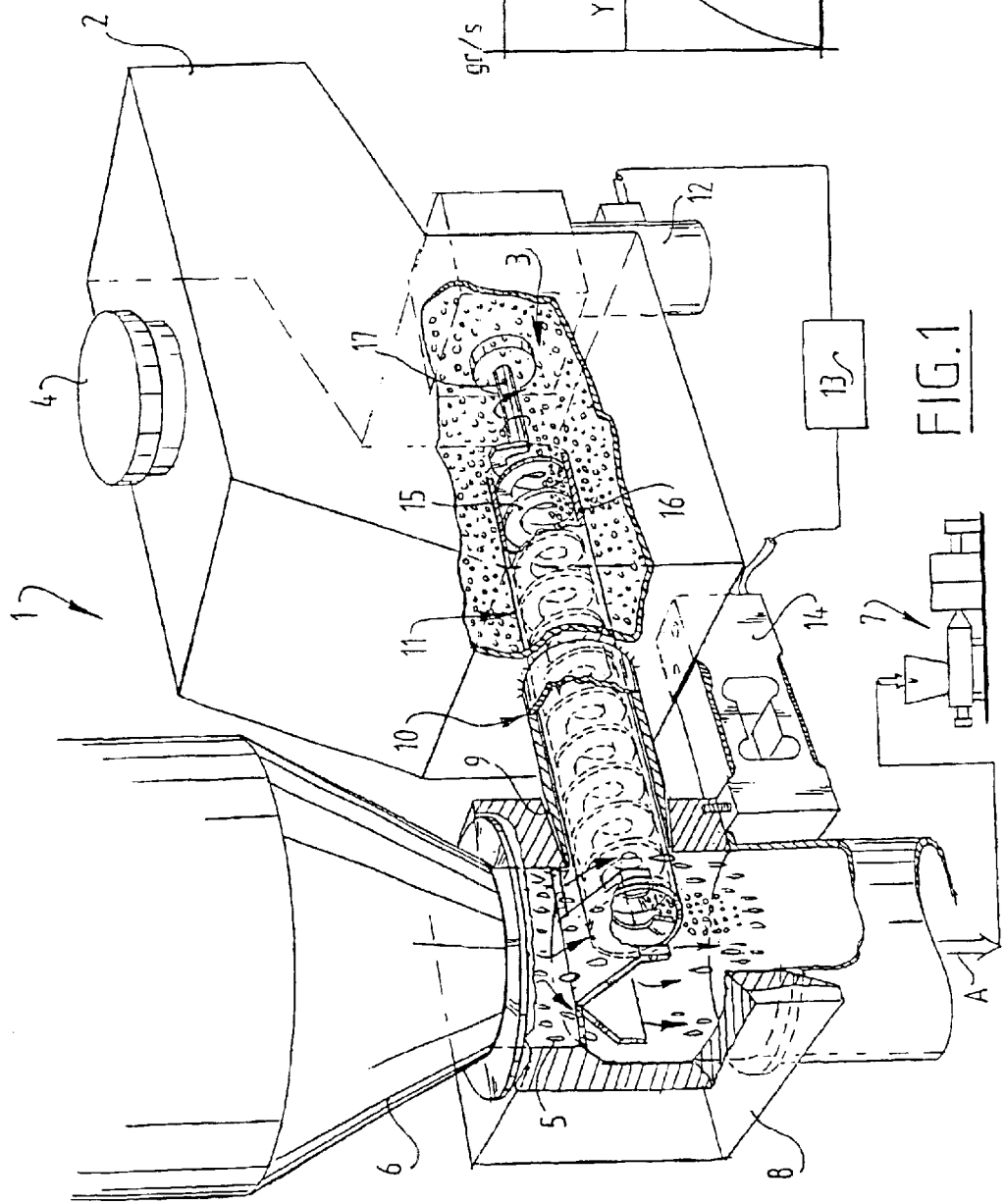

DOSING DEVICE

BACKGROUND OF THE INVENTION

1. Field of the Invention

The present invention relates to a dosing device for adding an additive to a basic flow. Such dosing devices are generally known, whereby for instance dye can be added to a raw material for an extrusion process so as to provide the finished product with colour.

2. Description of the Related Art

In such known dosing devices use is usually made of a rigid construction to arrange a container for the additive. Weighing means can then be placed between the rigid construction and the container for the additive.

A drawback of the known art is that such constructions are usually unnecessarily complex, particularly when a narrowing occurs in the passage for the basic flow with raw material in the flow direction prior to a follow-on operation. It is desirable here to keep as short as possible the distance over which additive for dosing must be displaced by a dosing mechanism. This is desirable in order to obtain the quickest possible response to a change in the operation of the dosing mechanism, for instance if a drive co-acting with the dosing mechanism is controlled to a higher or lower dosing rate by a control connected to the weighing means.

SUMMARY OF THE INVENTION

The present invention has for its object to obviate at least the above stated and possibly also other problems of the known dosing devices, for which purpose a dosing device is provided which is distinguished according to the invention by the combination of measures according to the main claim.

According to the present invention a dosing device has a simple and elegant construction with which precise dosing is possible.

The weighing means preferably comprise a compensation for shifting the centre of gravity of the dosing device with the additive therein. Such a preferred embodiment is particularly favourable in respect of the above described narrowing in the passage for the basic flow, wherein the container can have a form corresponding with this narrowing. This, once again, to keep as short as possible the distance between the container for the additive and the passage for the basic flow, and hereby also the dosing mechanism. As the level of additive in the container falls, a shifting of the centre of gravity herein takes place which, in a configuration wherein the dosing mechanism is connected to the inlet via the weighing means, influences the weight weighed using the weighing means. This is particularly the case when the container is not wholly supported by the weighing means, but the weighing means actually form a connection between the inlet and the dosing mechanism. By providing the weighing means with such a compensation a reliable measurement of the weight of at least the container and the additive therein is obtained at all times, as well as a determination of the outflow at a set operation of the dosing mechanism, so that accurate dosing is possible, irrespective of any displacement or shifting of the centre of gravity of the container with the additive in a lateral direction.

The weighing means can be designed in different ways, for instance as a load cell, which is then for instance an off-centre load cell, which is a type of load cell which comprises a compensation for the distance to the weight load—within limits known in advance such as the size of a weighing platform extending from the load cell for carrying the weight load for weighing.

A dosing device according to the invention preferably has the feature that the inlet comprises a neck part, through which the passage extends, and an opening forming the inlet for loosely receiving therein an outlet of the dosing mechanism. Thus is ensured that contact between the dosing mechanism and the opening cannot have any adverse effect on measurement by the weighing means, since such contact is avoided.

In a further preferred embodiment a dosing device according to the invention has the feature that the dosing mechanism comprises a worm screw in a cylinder which is connected to the drive and forms a dosing cylinder, wherein the worm screw and the cylinder form a unit. Surprisingly, such a dosing cylinder is found to have a very readily predictable dosing characteristic, although in many cases it displays a non-linear relation between the rotation speed of the dosing cylinder and the discharge thereof in mass per unit of time. When these are known in advance, such readily predictable characteristics are very useful for adjusting the control serving to manage the drive on the basis of measurement data from the weighing means. Such readily predictable characteristics, which are co-dependent on the material properties of the additive used at a particular moment and which can be determined by experiment, can be used to obtain a desired discharge of additive into the basic flow. Very slight fluctuations, for instance in the material properties, will already affect the discharge if this is set automatically on the basis of a predetermined characteristic. In a further preferred embodiment a control is thus provided which is adapted to bring about with a corrective algorithm an adjustable dosed discharge by adjusting the rotation speed of the dosing cylinder caused by the drive on the basis of determinations of weight made by the weighing means. The characteristics of the dosing cylinder known in advance can herein be used on the basis of the material properties of the additive for dosing in order to use a first good approximation of the desired rotation speed to obtain a dosed discharge, whereafter the corrective algorithm is applied to obtain a precise adjustment of the dosed desired discharge.

BRIEF DESCRIPTION OF THE DRAWINGS

The invention will be further described hereinbelow with reference to the annexed figures, wherein:

FIG. 1 shows a partly cut-away perspective view of a dosing device according to the present invention; and FIG. 2 shows a characteristic associated with the dosing mechanism shown in FIG. 1 for a determined additive.

DETAILED DESCRIPTION OF THE PREFERRED EMBODIMENTS

The dosing device 1 shown in FIG. 1 comprises a container 2 for additive 3, which can be introduced into container 2 using a filler cap 4. Additive 3 has to be added to a basic flow 5, which flows through a passage 6. A mixture of the basic flow 5 and the additive 3 added thereto is carried in the direction of arrow A to a further processing device 7, for instance an injection-moulding machine or an extruder.

Passage 6 debouches into a neck part 8 with an inlet 9 for infeed of additive 3. Placed into inlet 9 is a dosing mechanism 10 which comprises a dosing cylinder 11 for displacing additive 3 from container 2 to neck part 8.

Dosing cylinder 11 is connected to a motor 12, for instance a stepping motor, which is driven by a control 13, which is connected in turn to a load cell 14 of the single point type which forms weighing means, and which comprises a compensation for shifting the centre of gravity of the container with the additive 3 therein. A signal representative of the weighed weight of container 2 with additive 3 is sent to control 13 by load cell 14, which can be an off-centre load cell. Control 13 processes the data coming from load cell 14 and drives the motor 12 on the basis hereof, whereby a higher or lower rotation speed of dosing cylinder 11 can be realized as desired. The motor thus forms a drive, controllable by the control, for the dosing mechanism formed by dosing cylinder 11.

Load cell 14 forms the connection between neck part 8 and container 2. Dosing cylinder 11 protrudes loosely into the inlet 9 in neck part 8. Owing to the clearance between dosing cylinder 11 and inlet 9 of neck part 8 a reliable measurement can be obtained using load cell 14 in respect of the weight of container 2 and additive 3 therein. The clearance is however so small that no loss of material from the basic flow or additive can occur therealong.

Container 2 has a form corresponding with the narrowed form of passage 6. In this manner the dosing cylinder 11 can be kept short, together with the distance between the container and the neck part. A change in the rotation speed of dosing cylinder 11 achieved with motor 12 thus has practically immediate result, and the configuration is compact and simple.

Owing to the form of container 2 corresponding with the narrowing in passage 6 the centre of gravity of container 2 with the additive 3 therein shifts in obliquely downward direction as more additive 3 is introduced into the basic flow 5 with the dosing mechanism. Such a lateral displacement of the centre of gravity of container 2 with additive 3 results in a changing moment of force, which would influence the measurement with load cell 14. According to the present invention however, load cell 14 is provided with a compensation for such a shift.

As already noted above, such a load cell is for instance an off-centre load cell. Other load cells compensated for such shifts in centres of gravity, or other weighing means which are not sensitive to such shifts, can also be applied. On neck part 8 is for instance mounted a platform on which the container rests in freestanding manner with more conventional scales between the platform and container 2.

The stated off-centre load cell is active within a predetermined range, which for instance forms a platform with known dimensions. Such a platform is for instance 400 mm×400 mm. Such a platform can be physically present or, as in the case of FIG. 1, formed by the bottom of container 2. The said off-centre load cell can weigh very accurately with a total error in the order of magnitude of 0.01% or even less. A very precise dosing is thus possible herewith.

Dosing cylinder 11 comprises a helical worm 15 which is connected to a drive shaft 17, which is connected in turn to motor 12. Round the helical worm 15 is arranged a cylinder which is arranged fixedly on helical worm 15 and forms a unit therewith. Cylinder 16 thus co-rotates with helical worm 15 under the driving action of motor 12.

In this construction the characteristic of dosing mechanism 10 displays a non-linearity in the relation between the discharge in mass per unit of time and the rotation speed of motor 12 imposed on dosing mechanism 10. Such a non-linear characteristic is plotted in FIG. 2 for a specific type of additive 3. The characteristic shown in FIG. 2 will have a different progression for a different additive 3 with other material properties. The non-linearity of this characteristic is related to the configuration of dosing cylinder 11, wherein cylinder 16 and helical worm 15 are fixed to each other.

At a desired discharge Y, two possibilities of which are given in FIG. 2, this can be fed into control 13 in order to drive the motor 12, for instance a stepping motor, on the basis thereof. On the basis of prior knowledge and perhaps a characteristic of a specific additive 3, an estimate X is made of a desired rotation speed. In the case of the higher of the two values Y in FIG. 2 an error of estimation is however made, for instance due to variation in the material properties per shipment obtained from a producer. At the rotation speed X anticipated to be associated with value Y a higher discharge than Y is found to result. On the basis of measurement results of the weight of container 2 with additive 3 therein, the control 13 thus provides adjustment of the rotation speed by driving motor 12, wherein the rotation speed is reduced to value X', wherein the desired value of discharge Y is realized. A similar situation occurs at the lower of the two values Y in FIG. 2, wherein the rotation speed must however be increased from X to X' in order to obtain the desired value of discharge Y. At the rotation speed X anticipated on the basis of prior knowledge, a discharge lower than the desired discharge Y was obtained.

It will be apparent that many alternative and additional embodiments are possible within the scope of the present invention, the scope of protection of which is defined in the appended claims. It is for instance possible, as alternative to the use of load cells, to also use other constructions and still realize a compact configuration with the shortest possible distance between the container and the neck part and, in the same context, the shortest possible length of the dosing mechanism. As addition, filling means can be provided which, when a low level has been reached in the container, automatically carry out refilling of the container with additive. If the control operates in integrating manner, such refilling operations will have to be taken into account because of the discontinuity in the measuring results associated therewith. For the skilled person in this technical field it will be possible to take such measures without difficulty. In contrast to the configuration shown in FIG. 1, the load cell can also be arranged on the side of the neck part and the side of the container. It is further possible for more than one load cell to be applied, and for instance for the combined measuring result of the load cells to be applied. A damping can further be arranged in order to suppress or damp vibrations which could disturb the measurements. Such a damping can be designed as a bellows-shaped element under the load cell, in which for instance damping fluid, such as oil, water and so on, can then be arranged. It is herein not desirable for the damping to "carry" the load cell such that the measuring result is reduced, although in the application according to the invention the weight decrease is of particular importance, since speed of measurement is also an important factor in a desired operation of the dosing device. The damping can be arranged close to the neck part, but is expected to be more effective if it is placed close to the container under the load cell. Other variants and alternatives are also possible according to the invention as this is not only disclosed in the foregoing but is also defined in the appended claims.

What is claimed is:

1. A dosing device for mixing an additive into a basic flow, comprising:
    a) a passage for the basic flow, the passage configured such that the basic flow is continuous;
    b) an inlet for the additive in the passage;
    c) a container for the additive connected to the inlet via a dosing mechanism, the dosing mechanism protruding into the passage, and the container having a controllable drive for discharge of the additive into the passage;

d) weighing means for determining the weight of at least the container with the additive; and e) a control for the controllable drive which is connected to the weighing means for setting a dosed discharge, wherein the dosing mechanism is arranged on the inlet via the weighing means.

2. The device as claimed in claim 1, wherein the weighing means comprise a compensation for shifting the centre of gravity of the container with the additive therein.

3. The device as claimed in claim 1, wherein the weighing means comprise a load cell.

4. The device as claimed in claim 3, wherein the load cell is of the off-centre type.

5. The device as claimed in claim 1, wherein the inlet comprises a neck part, through which the passage extends, and with an opening forming the inlet for loosely receiving therein an outlet of the dosing mechanism.

6. The device as claimed in claim 1, wherein the dosing mechanism comprises a worm screw in a cylinder which is connected to the drive and forms a dosing cylinder, wherein the worm screw and the cylinder form a unit.

7. The device as claimed in claim 6, wherein the discharge in mass per unit of time relative to the rotation speed of the dosing cylinder is non-linear and the control is configured to bring about with a collective algorithm an adjustable dosed discharge by adjusting the rotation speed of the dosing cylinder caused by the drive on the basis of determinations of weight made by the weighing means.

* * * * *